United States Patent
Yu et al.

(10) Patent No.: US 11,150,326 B2
(45) Date of Patent: Oct. 19, 2021

(54) RADAR SYSTEM WITH ANGLE ERROR DETERMINATION FUNCTION AND METHOD THEREOF

(71) Applicant: CUBTEK INC., Zhubei (TW)

(72) Inventors: San-Chuan Yu, Zhubei (TW); Shyh-Jong Chung, Zhubei (TW); Jyong Lin, Zhubei (TW)

(73) Assignee: CUBTEK INC., Zhubei (TW)

( * ) Notice: Subject to any disclaimer, the term of this patent is extended or adjusted under 35 U.S.C. 154(b) by 309 days.

(21) Appl. No.: 16/243,522

(22) Filed: Jan. 9, 2019

(65) Prior Publication Data
US 2020/0088841 A1 Mar. 19, 2020

(30) Foreign Application Priority Data
Sep. 17, 2018 (TW) ................. 107132657

(51) Int. Cl.
*G01S 7/40* (2006.01)
*G01S 13/931* (2020.01)
*G01S 13/86* (2006.01)

(52) U.S. Cl.
CPC .............. *G01S 7/4026* (2013.01); *G01S 7/40* (2013.01); *G01S 13/867* (2013.01); *G01S 13/931* (2013.01); *G01S 7/403* (2021.05); *G01S 2013/93271* (2020.01)

(58) Field of Classification Search
CPC .... G01S 7/40; G01S 7/4026; G01S 2007/403; G01S 2007/4034; G01S 13/867; G01S 13/931
See application file for complete search history.

(56) References Cited

U.S. PATENT DOCUMENTS

| | | | | |
|---|---|---|---|---|
| 4,489,322 A | * | 12/1984 | Zulch | G01S 13/867 342/149 |
| 6,590,521 B1 | * | 7/2003 | Saka | G01S 13/867 342/70 |
| 6,967,612 B1 | * | 11/2005 | Gorman | G01S 13/34 342/22 |
| 7,221,310 B2 | | 5/2007 | Nakagawa | |
| 7,777,669 B2 | * | 8/2010 | Tokoro | G01S 13/931 342/70 |
| 8,217,830 B2 | * | 7/2012 | Lynam | G01S 13/867 342/70 |

(Continued)

*Primary Examiner* — Peter M Bythrow
(74) *Attorney, Agent, or Firm* — Muncy, Geissler, Olds & Lowe, P.C.

(57) ABSTRACT

A radar system with angle error determination function and method thereof are provided. The system includes a camera device, a radar device, a calculation module, and an angle calibration module. The camera device captures a surveillance image of a surveillance area. The radar device sends a radar signal toward the surveillance area. The calculation module, according to the surveillance image, acquires an image angle of an object with respect to the vehicle in the surveillance area. Also, the calculation module acquires a radar angle of the object with respect to the vehicle which is produced according to a reflection signal generated when the radar signal meets the object. The angle calibration module, by referring to the image angle, correspondingly calibrates the radar angle. Therefore, the radar angle is immediately calibrated.

12 Claims, 7 Drawing Sheets

(56) References Cited

U.S. PATENT DOCUMENTS

| | | | | |
|---|---|---|---|---|
| 8,930,063 B2* | 1/2015 | Gandhi | ................... | G01S 13/58 |
| | | | | 701/31.1 |
| 8,988,276 B2* | 3/2015 | Nishigaki | .......... | G06K 9/00805 |
| | | | | 342/52 |
| 9,052,393 B2* | 6/2015 | Kriel | ........................ | G06K 9/62 |
| 9,797,734 B2* | 10/2017 | Mizutani | ............... | G01S 13/726 |
| 10,037,472 B1* | 7/2018 | Chen | ...................... | G01S 13/867 |
| 10,209,717 B2* | 2/2019 | Hazelton | ............... | G01S 13/867 |
| 10,578,713 B2* | 3/2020 | Yomo | ................... | G01S 13/931 |
| 10,670,697 B2* | 6/2020 | Yamazaki | ............ | H04N 13/246 |
| 10,908,257 B2* | 2/2021 | Motoyama | ................ | G06T 7/74 |
| 2004/0080449 A1* | 4/2004 | Horibe | ................. | G01S 13/867 |
| | | | | 342/70 |
| 2004/0080450 A1* | 4/2004 | Cheong | ................ | G01S 7/4026 |
| | | | | 342/118 |
| 2004/0246167 A1* | 12/2004 | Kumon | ................... | G01S 7/412 |
| | | | | 342/70 |
| 2009/0201192 A1* | 8/2009 | Tokoro | ................. | B60W 30/09 |
| | | | | 342/70 |
| 2010/0256940 A1* | 10/2010 | Ogawa | ................... | G01S 17/42 |
| | | | | 702/97 |
| 2016/0320476 A1* | 11/2016 | Johnson | ............... | G01S 7/2955 |
| 2017/0169627 A1* | 6/2017 | Kim | ..................... | G05D 1/0257 |
| 2018/0259621 A1* | 9/2018 | Yamazaki | ............ | G01S 13/867 |
| 2018/0267142 A1* | 9/2018 | Motoyama | ............. | G01S 13/86 |
| 2019/0163198 A1* | 5/2019 | Niesen | ...................... | G06T 7/50 |

\* cited by examiner

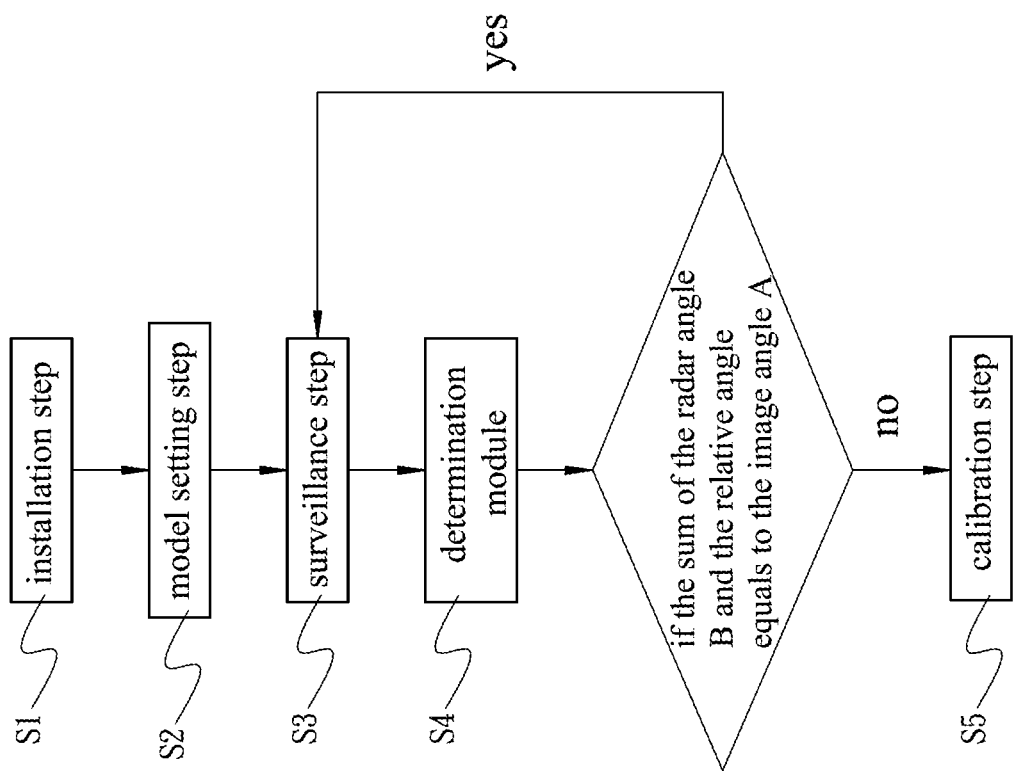

RADAR SYSTEM WITH ANGLE ERROR DETERMINATION FUNCTION AND METHOD THEREOF

BACKGROUND OF THE INVENTION

1. Field of the Invention

The present invention relates to radar systems, and more particularly, to a radar system with angle error determination function and method thereof.

2. Description of the Related Art

A forward collision warning (FCW) system is applied for detecting the obstacles in front of a vehicle by a sensor installed on the vehicle. If the system detects an obstacle existing in the warning area, the system will actively send out a warning light or warning alarm to the driver, allowing the driver to stop driving or avoid the obstacle according to the warning, thus preventing the traffic accident from happening due to inattention or vision blind spot.

Current FCW systems are generally divided into image detection system and radar system. Therein, the image detection system applies the camera to acquire an image of the warning area for detecting the obstacles. However, the image detection system is easily affected by weather variation to cause a detection failure or misjudge. In comparison, the radar system will not be affected by weather variation, thus being able to improve the disadvantage of image detection system and increase the detection accuracy.

However, an ordinary radar is installed on the front portion of the vehicle. As a result, the detection direction and angle of the radar will easily deviate when bumping on the road or undergoing collision. Therein, when an angle deviation of the radar occurs, a calibration is needed for correcting the detection angle of the radar. Referring to U.S. Pat. No. 7,221,310B2, an electric wave axis adjusting apparatus for radar mounted on vehicle has a reflector is installed in the radar scanning range which is sent out by the radar, so as to change the angle of the scanning range to an axis side of the vehicle based on the direction of the reflector calculated by the signal processing means to align an electric wave axis of the on-vehicle radar with the axis. Therefore, the angle of the radar is adjusted.

However, such radar angle adjusting apparatus is unable to be operate by general drivers. Therefore, upon any radar angle deviation occurring, the apparatus of such patent or other radar adjusting devices have to be operated by a mechanic in an automobile maintenance plant, thus being time costing and causing the inconvenience of driver.

Also, when the radar angle changes, the position of a detected obstacle is incorrect, and the driver is unable to accurately evade the obstacle and suffers from the possibility of accident. Therefore, if the radar angle is not immediately corrected upon the abnormality, the driving safety of driver will be threatened.

SUMMARY OF THE INVENTION

For improving the issues above, a radar system with angle error determination function and method thereof are disclosed. When the radar angle is abnormal, by acquiring the correct radar angle according to the image angle of the camera device, the radar angle is calibrated, achieving an immediate radar angle error determination and calibration function.

For achieving the aforementioned objectives, a radar system with angle error determination function is provided, comprising:

a camera device disposed at a first position of a vehicle, the camera device capturing a surveillance image of a surveillance area;

a radar device disposed at a second position of the vehicle, the second position differing from the first position, the radar device sending a radar signal toward the surveillance area, such that when the radar signal meets an object, a reflection signal is accordingly generated;

a calculation module electrically connected with the camera device and the radar device, the calculation module acquiring an image angle of an object with respect to the vehicle according to the surveillance image, the calculation module also acquiring a radar angle of the object with respect to the vehicle according to the reflection signal;

a determination module coupled with the calculation module for comparing the radar angle to the image angle; and an angle calibration module, the calibration module calibrating the radar angle according to the image angle.

With such configuration, when the radar angle changes, the system of the present invention is able to automatically adjust the radar angle, thus making the radar angle indicating the object position displayed by the radar device be consistent with the image angle of the camera device. Therefore, the inconvenience of a conventional radar angle calibration operation, which shall be operated by the mechanic at an automobile maintenance plant, is resolved, achieving a fast calibration function.

Also, during the vehicle driving process, the abnormality of the radar angle will be pointed out immediately, and the radar angle is calibrated in time based on the image angle of the camera device. Therefore, the accuracy of the FCW system is maintained, facilitating a safe driving.

BRIEF DESCRIPTION OF THE DRAWINGS

FIG. 7 is a flow chart of the method in accordance with an embodiment of the present invention.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
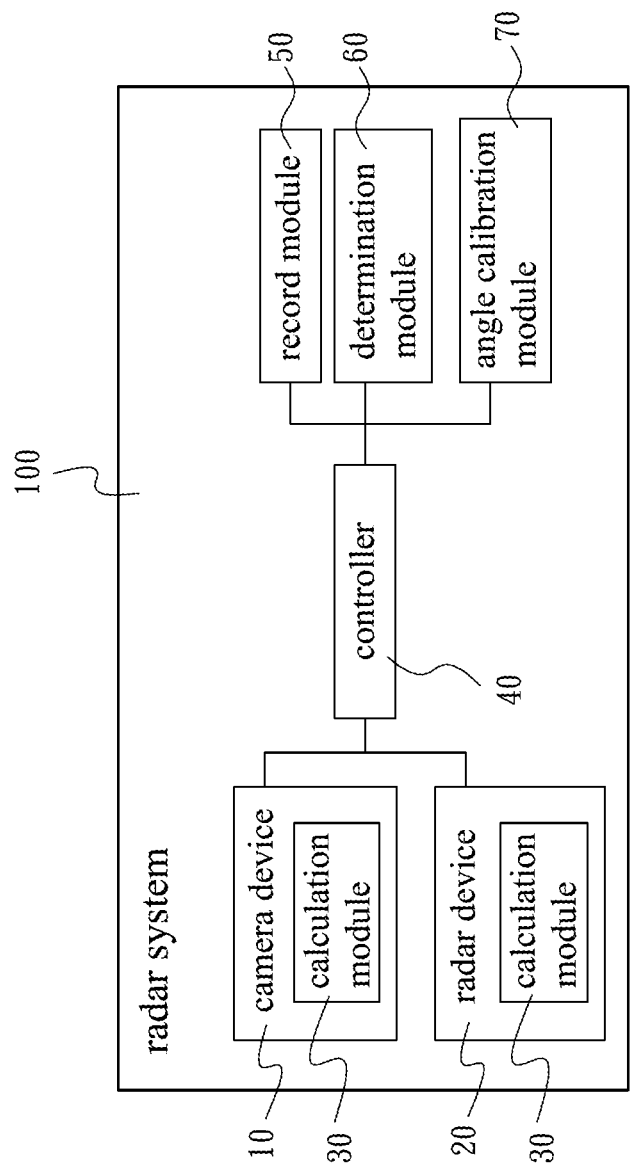
FIG. 1 is a block diagram of the system in accordance with an embodiment of the present invention.
Figure 2:
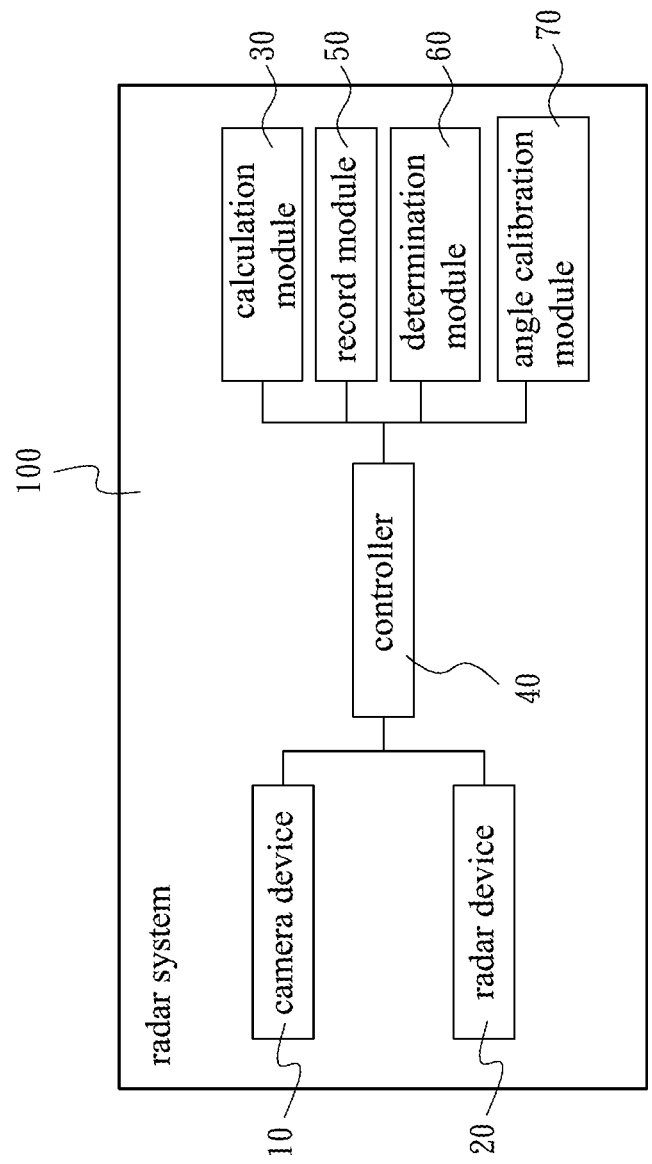
FIG. 2 is a block diagram of the system in accordance with another embodiment of the present invention.

Referring to FIG. 1 to FIG. 6, a radar system 100 is provided by the present invention. Therein, FIG. 1 is a block diagram of the system in accordance with an embodiment of the present invention, and FIG. 2 is a block diagram of the system in accordance with another embodiment of the present invention. The radar system 100 comprises a camera device 10, a radar device, a calculation module 30, a record module 50, a determination module 60, and an angle calibration module 70.

The camera device 10 is disposed at a first position 2 of the vehicle 1 for capturing a surveillance image of a surveillance area around the vehicle 1. The camera device 10 is allowed to generate the surveillance image in a videotaping or photographing manner. When the camera device 10 applies a videotaping manner, the surveillance image is a dynamic continuous image. When the camera device 10 applied a photographing manner, the surveillance image is a static image, but the camera device 10 will consecutively generate the surveillance images. Therein, the camera device 10 is able to be set up a time interval between each photographing operation, and the time interval is able to be 0.01 seconds or other equivalent time duration. Therefore, a continuous image is generated.

The radar device 20 is disposed at a second position 3 of the vehicle 1 and sends a radar signal toward the surveillance area. When the radar signal meets an object 4 in the surveillance area, a reflection signal is generated.

In addition, the second position 3 differs from the first position 2. The first position 2 of the vehicle 1 is allowed to be on the top potion, front portion, rear portion, left side, or right side of the vehicle 1, wherein the camera device 10 and the radar device 20 face the surveillance area toward a same direction. When the first position 2 is on the top portion of the vehicle 1, the camera of the camera device 10 is able to face toward the front portion, rear portion, left side, or right side of the vehicle 1, while the surveillance area is in front of, behind, on the outer left side, or on the outer right side of the vehicle 1. When the first position 2 is on the front portion of the vehicle 1, the camera device 10 is allowed to be installed in adjacent to the front bumper, front license frame, or the hood of the vehicle 1, while the surveillance area is in front of the vehicle head. When the first position 2 is on the rear portion of the vehicle, the camera device 10 is allowed to be installed in adjacent to the rear bumper, rear license frame, or the trunk lid, while the surveillance area is behind the rear portion of the vehicle 1. When the first position 2 is on the left or right sides of the vehicle 1, the camera device 10 is allowed to be installed on the vehicle door or door frame, while the surveillance area is on the outer left or outer right sides of the vehicle 1.

Figure 3:
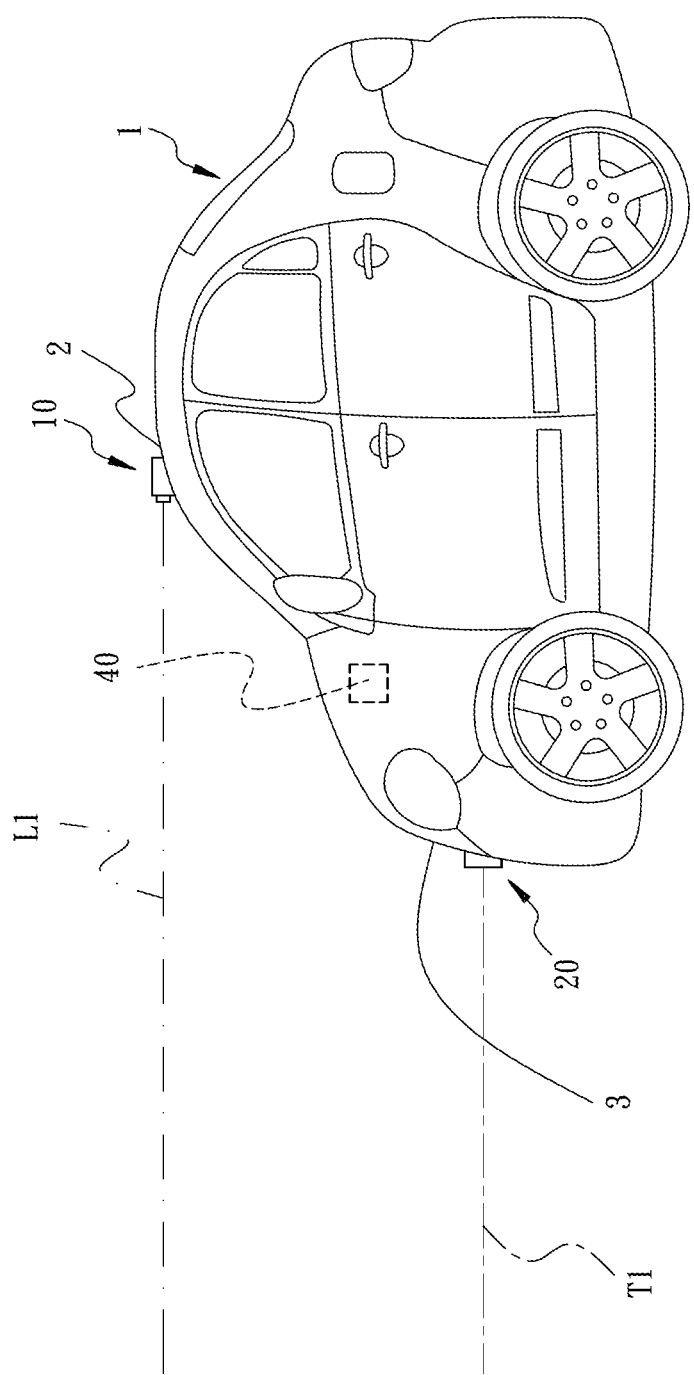
FIG. 3 is a schematic side view of the system in accordance with an embodiment of the present invention, illustrating the camera device and the radar device installed on the vehicle.
Figure 4:
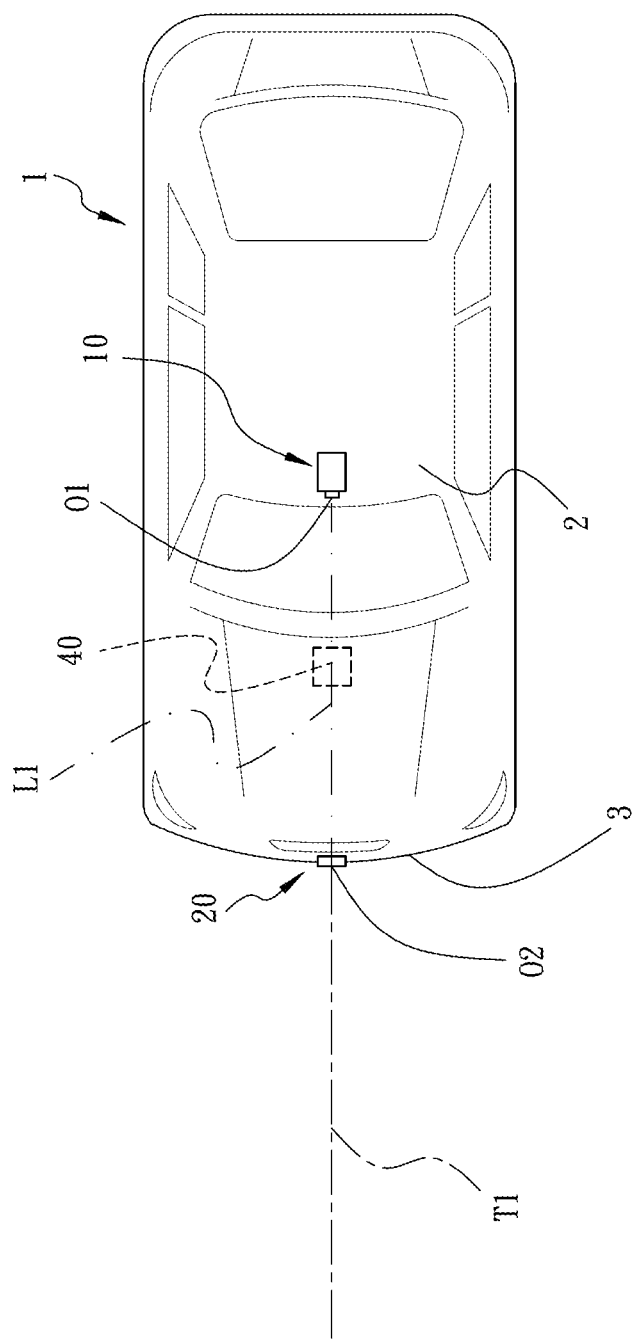
FIG. 4 is a schematic top view of the system, illustrating the camera and the radar device installed on the vehicle.

In the first and second embodiments of the present invention, referring to FIG. 3 and FIG. 4, the first position 2 is disposed higher than the second position 3. Therein, the first position 2 is on the top portion of the vehicle 1, and the second position 3 is on the vehicle head, while the surveillance area is in front of the vehicle head. The camera device 10 and the radar device 20 face toward the front side of the vehicle head for detecting.

The calculation module 30 is electrically connected with the camera device 10 and the radar device 20, Therein, in the first embodiment, the calculation module 30 is disposed on the camera device 10 and the radar device 20, respectively, as shown by FIG. 1. In the second embodiment, the calculation module 30 is disposed in a controller 40 which is disposed on the vehicle 1 and coupled with the camera device 10 and the radar device 20, as shown by FIG. 2. Therein, the controller 40 is allowed to be connected with the camera device 10 and the radar device 20 in a wired or wireless manner.

Figure 5:
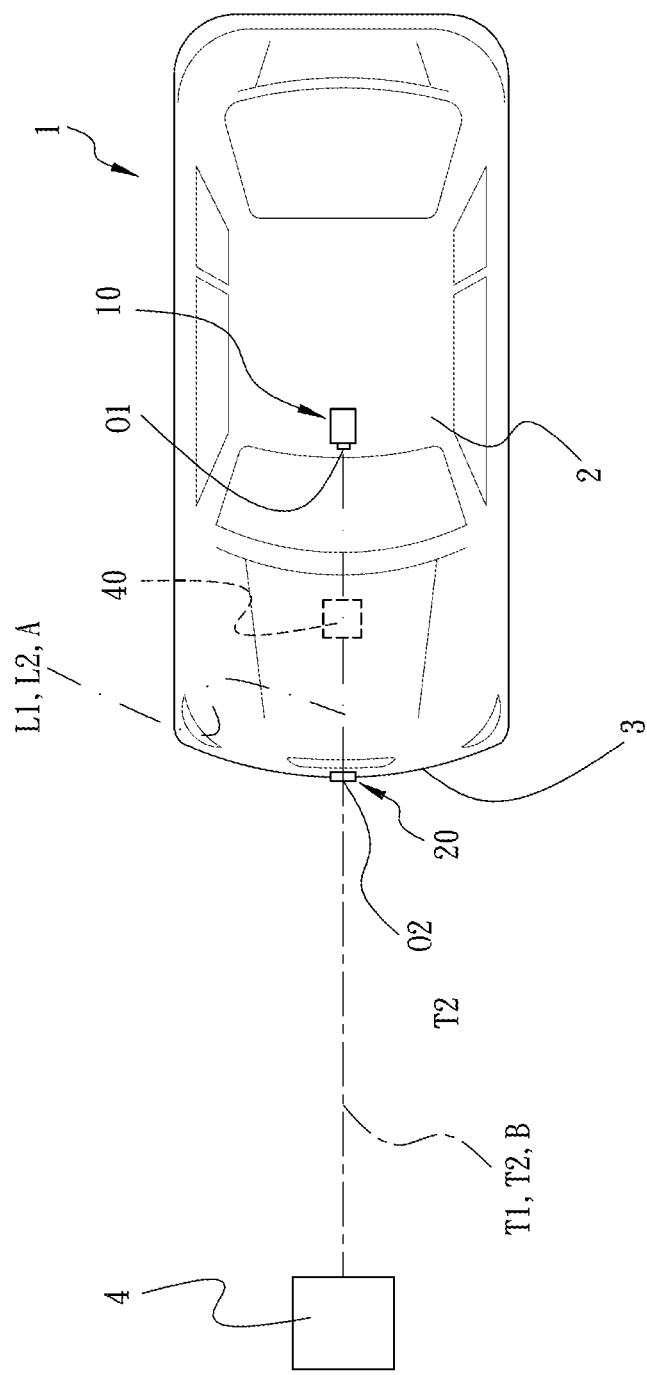
FIG. 5 is another schematic top view of the system, illustrating the object appearing in the surveillance area in front of the vehicle and detected by the camera device and the radar device.
Figure 6:
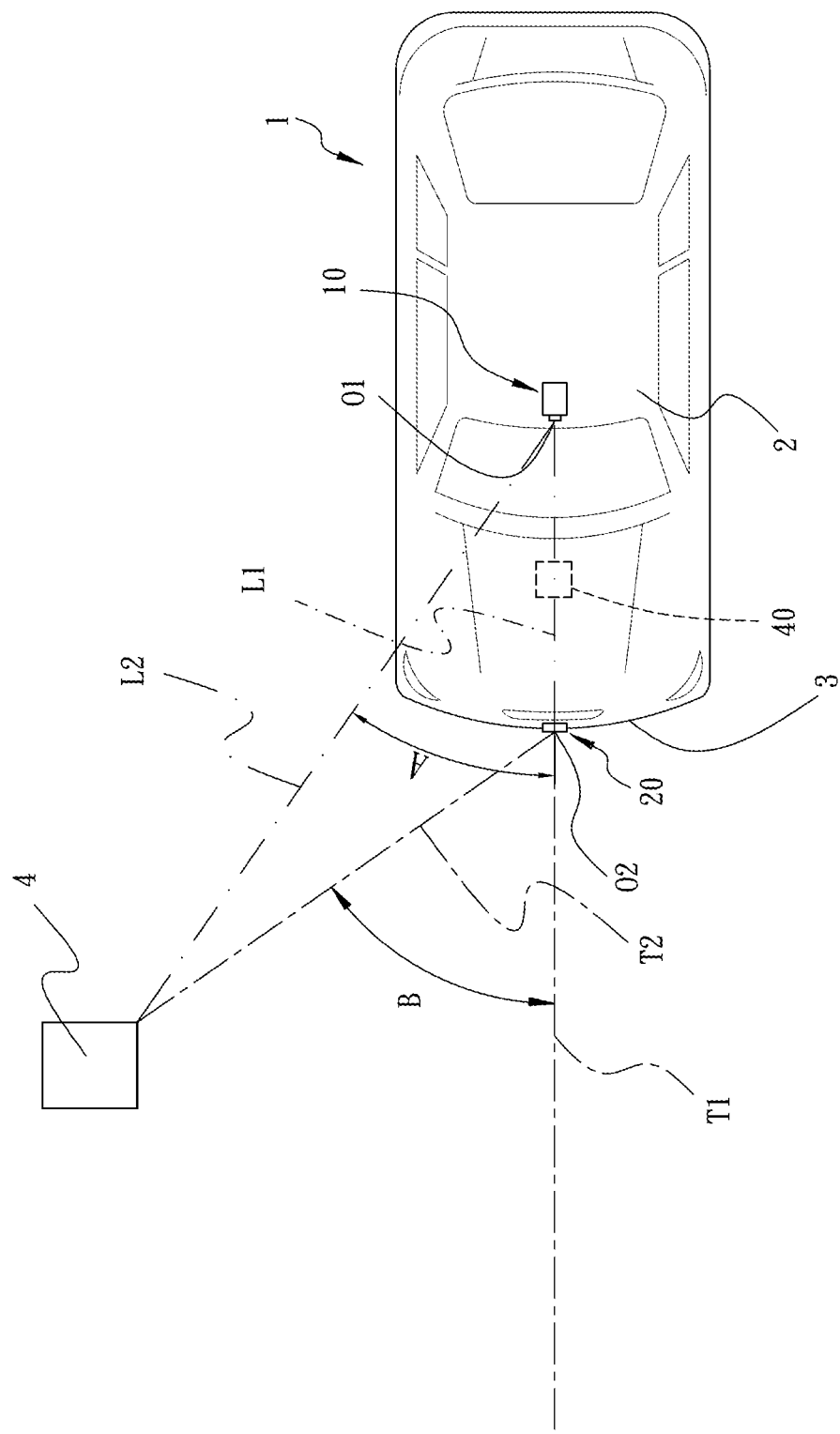
FIG. 6 is another schematic top view of the system, illustrating the object appearing in oblique front of the vehicle and detected by the camera device and the radar device.

Especially referring to FIG. 5 and FIG. 6, the calculation module 30 acquires an image angle A of the object 4 in the surveillance area with respect to the vehicle 1. More particularly, the calculation module 30, according to the surveillance image, defines the first position 2 on which the camera device 10 being installed as an image base point O1, and defines an image base line L1 which extends outward in a straight line from the image base point O1. In the first and second embodiments, the image base line L1 extends toward the direction identical to the marching direction of the vehicle 1. Also, the calculation module 30 defines an image imaginary line L2 which extends in a straight line from the image base point O1 toward a portion of the object 4 which is nearest to the vehicle 1. The calculation module 30 defines the angle included by the image base line L1 and the image imaginary line L2 as the image angle A, wherein the angle A is allowed to be present in positive or negative degrees. Referring to FIG. 6, when the image imaginary line L2 is at the left side of the image base line L1 (based on the view point of the drawing with the vehicle head facing upward), the image angle A is defined as a positive degree. When the image imaginary line L2 is at the right side of the image base line L1 (based on the view point of the drawing with the vehicle head facing upward), the image angle A is defined as a negative degree.

Referring to FIG. 5, the object 4 appears in front of the vehicle 1. The image imaginary line L2 extends from the image base point O1 toward the object 4, while the image base line L1 and the image imaginary line L2 are on the same straight line, such that the image angle is 0 degrees. Referring to FIG. 6, the object 4 appears in oblique front of the vehicle head, and the image imaginary line L2 extends from the image base point O1 toward the bottom-left corner (based on the view point of the drawing with the vehicle head facing upward) of the object 4, such that the image angle A is not 0 degrees.

According to the reflection signal, the calculation module 30 acquires a radar angle B of the object 4 with respect to the vehicle 1. More particularly, the calculation module 30 defines the radar device 20 as a radar base point O2, and a radar base line T1 extends outward from the radar base point O2 in a straight line. In the first and second embodiments, the radar base line T1 extends toward the direction identical to the marching direction of the vehicle 1. Also, the calculation module 30 acquires the direction of the object 4 in the surveillance area. Therefore, the calculation module 30 defines a radar imaginary line T2 extending from the radar base point O2 toward the object 4 in a straight line. Then, the calculation module 30 defines the angle included by the radar base line T1 and the radar imaginary line T2 as the radar angle B, wherein the radar angle B is allowed to be present in positive or negative degrees. Referring to FIG. 6, when the radar imaginary line T2 is at the left side of the radar base line T1 (based on the view point of the drawing with the vehicle head facing upward), the radar angle B is defined as a positive degree. When the radar imaginary line T2 is at the right side of the radar base line T1 (based on the view point of the drawing with the vehicle head facing upward), the radar angle B is defined as a negative degree.

Referring to FIG. 5, the object 4 appears in front of the vehicle 1. The radar imaginary line T2 extends from the radar base point O2 toward the object 4, while the radar base line T1 and the radar imaginary line T2 are on the same straight line. Referring to FIG. 6, the object 4 appears in oblique front of the vehicle head, and the radar imaginary line T2 extends from the radar base point O2 toward the bottom-left corner (based on the view point of the drawing with the vehicle head facing upward) of the object 4.

The record module 50 is disposed in the controller 40. The record module 50 stores a relative angle, which is the angular difference between the radar angle B and the image angle A. More particularly, the camera device 10 and the radar device 20 are disposed at different positions, so that the image base line L1 of the surveillance image and the radar base line T1 of the radar signal are different. Therefore, a difference exists between the image angle A and the radar angle B that are calculated by the calculation module 30, wherein the aforementioned relative angle is the angular difference between the radar angle B with respect to the image angle A. In the first embodiment, the record module 50 receives the image angle A calculated based on the camera device 10 and the radar angle B calculated based on the radar device 20 that are generated by the calculation module 30, and the record module 50 calculates the relative angle based on the image angle A and the radar angle B, and stores the relative angle therein. In the second embodiment, after the calculation module 30 generating the image angle A and the radar angle B and calculating the relative angle based on the image angle A and the radar angle B, the calculation module 30 sends the relative angle to the record module 50 to be stored therein.

The determination module 60 is coupled with the calculation module 30 and the record module 50. The determination module 60 is disposed in the controller 40. The determination module 60 receives the image angle A and the radar angle B calculated by the calculation module 30, so as to compare the radar angle B and the image angle A. When the radar angle B deviates with respect to the radar angle A, it is indicated that the radar angle B is abnormal. When the determination module 60 receives the image angle A and the radar angle B, the determination module 60 reads the relative angle in the record module 50, and the determination module 60 determines if the sum of the radar angle B and the relative angle equals to the image angle A. When the sum of the radar angle B and the relative angle does not equal to the image angle A, it is indicated that the radar angle B is abnormal.

The angle calibration module 70 is coupled with the determination module 60. The angle calibration module 70 is disposed in the controller 40. The angle calibration module 70, by reference of the image angle A, calibrates the radar angle B, so as to acquire the correct radar angle B. More particularly, when the sum of the radar angle B and the relative angle does not equal to the image angle A, the angle calibration module 70 accordingly adds the angular different between the sum and the image angle A, so as to calibrate the relative angle, and the calibrated relative angle is then stored in the record module 50. After the calibration, the sum of the radar angle B and the relative angle matches the image angle A, and the correct radar angle B corresponding to the object 4 is acquired.

Therefore, when the radar angle B is abnormal, the angle calibration module 70 automatically adjust the radar angle B to achieve a consistency between the radar angle B corresponding to the object 4 displayed by the radar device 20 and the image angle A of the camera device 10. With such configuration, the present invention effectively calibrates the radar angle B, thus saving the time needed for calibrating the radar angle B.

Furthermore, during the driving process of the vehicle 1, the radar system 100 is able to immediately detect the abnormality of the radar angle B of the radar device 20, and calibrate the radar angle B in time. Thereby, the accuracy of the FCW system is assured, so as to achieve the driving safety.

Referring to FIG. 1 to FIG. 7, a method for calibrating the radar angle through the radar system 100 is provided, comprising following steps: installation step S1, model setting step S2, surveillance step S3, determination step S4, and calibration step S5.

In the installation step S1, the camera device 10 is disposed at the first position 2 of the vehicle 1, and the radar device 20 is disposed at the second position 3 of the vehicle 1. The camera device 10 captures the surveillance image of the surveillance area around the vehicle 1. Also, during the image capturing process, the radar device 20 sends the radar signal toward the surveillance area.

In the model setting step S2, because the camera device 10 and the radar device 20 are disposed at different positions, the relative angular different therebetween is established. In the step, a basic object is disposed in the surveillance area; alternatively, an object 4 in the surveillance area is defined as the basic object. The calculation module 30 calculates the image angle A of the basic object with respect to the vehicle 1. Also, according to the reflection signal generated upon the radar signal meeting the basic object, the calculation module 30 calculates the radar angle B of the basic object with respect to the vehicle 1. Next, in the first embodiment, the record module 50 calculates the angular difference between the image angle A and the radar angle B, so as to define the angular difference thereof as the relative angle, which is then stored in the record module 50. In the second embodiment, the calculation module 30 calculates the angular difference between the image angle A and the radar angle B, so as to define the angular difference thereof as the relative angle, which is then stored in the record module 50.

In the surveillance step S3, after the vehicle 1 is turned on, during the driving or staying process, the camera device 10 continuously captures the surveillance image of the surveillance area, and the radar device 20 also continuously sends the radar signal toward the surveillance area. During the detection processes of the camera device 10 and the radar device 20, when the object 4 appears in the surveillance area, the calculation module 30 acquires the image angle A of the object 4 with respect to the vehicle 1 according to the surveillance image, and acquires the radar angle B of the object 4 with respect to the vehicle 1 according to the reflection signal. Therefore, the calculation module 30 efficiently calculates to acquire the image angle A and the radar angle B.

In the determination step S4, when the determination module 60 receives the image angle A and the radar angle B, the determination module 60 simultaneously reads the relative angle stored in the record module 50. At the same time, the determination module 60 determines if the sum of the radar angle B and the relative angle equals to the image angle A. When the sum equals to the image angle A, the determination module 60 determines that the radar angle B is normal, then the operation repeats to the surveillance step S3 to keep detecting if there is an object 4 existing in the surveillance are. When the sum does not equal to the image angle A, the determination module 60 determines that the radar angle is abnormal.

In the calibration step S5, when the determination module 60 determines that the radar angle B is abnormal, it is indicated that the radar angle B deviates with respect to the image angle A. In other words, the installation angle or position of the radar device 20 deviates from the original position, causing the deviation of the relative angle. Therefore, by reference of angle A, and according to the angular difference between the sum of the radar angle B and the relative angle against the image angle A, the angle calibration module 70 calibrates the relative angle and stores the calibrated relative angle in the record module 50. Also, after the calibration, the radar angle B is added with the calibrated relative angle to match the image angle A, so as to acquire the correct radar angle B corresponding to the object 4.

Referring to FIG. 1, FIG. 2, and FIG. 5, an example is provided for illustration. The initial relative angle stored in the record module 50 during model setting step S2 is positive 10 degrees. During the surveillance step S3, when the object 4 is located in front of the vehicle 1, the calculation module 30 calculates to acquire an image angle A of 0 degrees. If the calculation module 30 acquires a radar angle B of negative 10 degrees, during the determination step S4, if the determination module 60 adds the initial relative angle to the radar angle B to be equal to the image angle A, it means that the object 4 detected by the camera device 10 and the object 4 detected by the radar device 20 is detected are identical, and the radar angle B does not deviate. If only one object 4 existed in the surveillance area, and the radar angle B of the radar device 20 is negative 15 degrees, but the sum of the radar angle B and the initial relative angle does not equal to the image angle A, the FCW system determines that the objected detected by the camera device 10 and the object 4 detected by the radar device 20 are two different objects.

In the determination step S4, the determination module 60 compares the continuous surveillance image and the reflection signal of the radar device 20, so as to detect that an error exists in the radar angle B of the radar device 20. It is indicated that an abnormality occurs upon the radar device 20, and an angular difference of positive 5 degrees exists between the radar angle B and the image angle A. Therefore, in the calibration step S5, the angle calibration module 70 amends the relative angle in the record module 50 to positive 15 degrees. After the relative angle is calibrated, the radar angle B of negative 15 degrees is added with the relative angle of positive 5 degrees to be equal to the image angle A of 0 degrees.

Therefore, the radar angle B is calibrated, such that the radar angle B of the object 4 with respect to the vehicle 1 is equal to the image angle A. In other words, by adjusting the relative angle, the present invention shifts the radar angle B of the radar device 20, so that the obstacle detection ability of the camera device 10 and the radar device 20 are consistent and synchronized.

Referring to FIG. 1, FIG. 2, and FIG. 6, another example is provided for illustration. The initial relative angle stored in the record module 50 during model setting step S2 is positive 30 degrees. During the surveillance step S3, when the object 4 is located in oblique front of the vehicle 1, the calculation module 30 calculates to acquire an image angle A of 40 degrees. If the calculation module 30 acquires a radar angle B of positive 10 degrees, during the determination step S4, if the determination module 60 adds the initial relative angle to the radar angle B to be equal to the image angle A, it means that the object 4 detected by the camera device 10 and the object 4 detected by the radar device 20 is detected are identical, and the radar angle B does not deviate.

If only one object 4 existed in the surveillance area, and the radar angle B of the radar device 20 is positive 25 degrees, but the sum of the radar angle B and the initial relative angle does not equal to the image angle A in the determination step S4, it means that an angular deviation occurs upon the radar device 20, and the relative angle between the radar angle B and the image angle A is negative 15 degrees. Then, in the calibration step S5, the angle calibration module 70 amends the relative angle in the record module 50 to positive 15 degrees. After the relative angle is calibrated, the radar angle B of positive 25 degrees is added with the relative angle of positive 15 degrees to be equal to the image angle A of 40 degrees. Therefore, the radar angle B is calibrated, such that the radar angle B of the object 4 with respect to the vehicle 1 is equal to the image angle A.

With the foregoing configuration, the present invention achieves following objectives.

When the radar angle B of the object 4 detected by the radar device 20 is inconsistent to the image angle A detected by the camera device 10, it is indicated that the radar angle B is abnormal, and the angle calibration module 70 automatically adjust the radar angle B. Therefore, the radar angle B of the object 4 displayed by the radar device 20 is consistent to the image angle A of the camera device 10. The radar angle B is efficiently calibrated, thus simplifying the complexity of conventional method of angle calibration and saving the time demand.

Further, during the driving process, the radar system 100 of the present invention is able to detect the abnormality of radar angle B of the radar device 20 in time. If the determination module 60 determines that the radar angle B is abnormal, the angle calibration module 70 immediately calibrates the radar angle B. Therefore, the accuracy of the FCW system of the vehicle 1 is maintained, achieving a safe driving demand.

By defining the object 4 in front of the vehicle 1 as the basic object, and by defining the image angle A as 0 degrees for reference, the determination module 60 accurately determines if the radar angle B deviates. When the radar angle B deviates, the angle calibration module 70 calibrates the radar angle B by referring to the image angle A. Therefore, the radar angle B of the object 4 is efficiently and accurately calibrated, assuring the accuracy of the FCW system of the vehicle 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A radar system, comprising:
  a camera device disposed at a first position of a vehicle, the camera device capturing a surveillance image of a surveillance area;
  a radar device disposed at a second position of the vehicle, the second position differing from the first position, the radar device sending a radar signal toward the surveillance area, such that when the radar signal meets an object, a reflection signal is accordingly generated;
  a calculation module coupled with the camera device and the radar device; according to the surveillance image, the calculation module defining the camera device as an image base point, and extending an image base line outward from the image base point; the calculation module extending an image imaginary line from the image base point toward the object, so that the image base line and the image imaginary line include an image angle of the object with respect to the vehicle; the calculation module also acquiring a radar angle of the object with respect to the vehicle according to the reflection signal;
a record module storing a relative angle, the relative angle being an angular difference between the radar angle and the image angle; and
a determination module coupled with the calculation module for comparing the radar angle, the image angle, and the relative angle.

2. The radar system of claim 1, further comprising an angle calibration module coupled with the determination module, the angle calibration module calibrating the radar angle according to the image angle.

3. The radar system of claim 2, further comprising a controller coupled with the camera device and the radar device, the controller including the determination module and the angle calibration module, each of the camera device and the radar device including the calculation module, respectively.

4. The radar system of claim 2, further comprising a controller coupled with the camera device and the radar device, the controller including the calculation module, the determination module, and the angle calibration module.

5. The radar system of claim 1, wherein the calculation module defines the radar device as a radar base point, with a radar base line extending outward from the radar base point; the calculation module acquires a direction of the object according to the received reflection signal, with a radar imaginary line extending toward the object from the radar base line, such that the radar angle is formed between the radar base line and the radar imaginary line.

6. The radar system of claim 5, wherein the object is in front of the vehicle, and the image imaginary line and the image base line are on an identical straight line, with the image angle being 0 degrees; when the determination module determines that the radar angle does not equal to the image angle, the angle calibration module calibrates the radar angle.

7. The radar system of claim 1, wherein when the determination module determines that a sum of the radar angle and the relative angle does not equal to the image angle, the angle calibration module calibrates the relative angle, and the calibrated relative angle is stored in the record module.

8. An angle calibration method for a vehicle having a camera device and a radar device, the method comprising following steps:

surveillance step, the camera device capturing a surveillance image of a surveillance area, the radar device sending a radar signal toward the surveillance area; when an object appears in the surveillance area, according to the surveillance image, a calculation module defining the camera device as an image base point, and extending an image base line outward from the image base point; the calculation module extending an image imaginary line from the image base point toward the object, so that the image base line and the image imaginary line include an image angle of the object with respect to the vehicle; when the radar signal meets the object, a reflection signal is generated, and the calculation module generates a radar angle of the object with respect to the vehicle according to the reflection signal; and determination step, a record module storing a relative angle, the relative angle being an angular difference between the radar angle and the image angle; a determination module reads the relative angle and compares the image angle, the radar angle and the relative angle, so as to determine if the radar angle matches the image angle.

9. The method of claim 8, further comprising a calibration step, an angle calibration module calibrating the radar angle according to the image angle, such that the radar angle corresponds to the image angle.

10. The method of claim 9, wherein during the determination step, when the sum of the radar angle and the relative angle does not equal to the image angle, the determination module determines that the radar angle is abnormal.

11. The method of claim 10, wherein during the calibration step, when the sum of the radar angle and the relative angle does not equal to the image angle, the angle calibration module amends the relative angle according to the difference between the radar angle and the image angle, so as to make the sum of the radar angle and the relative angle equal to the image angle.

12. The method of claim 8, wherein during the determination step, when the object is in front of the vehicle, and the radar device, the camera device, and the object are arranged on an identical straight line, and the calculation module calculates the image angle as 0 degrees, if the determination module determines that the radar angle does not match the image angle, the determination module determines that the radar angle is abnormal.

* * * * *